United States Patent
Harris

(10) Patent No.: US 7,676,234 B2
(45) Date of Patent: Mar. 9, 2010

(54) ROUTING OF A SHORT MESSAGE ORIGINATED BY A MOBILE DEVICE

(75) Inventor: Ian Harris, Devizes (GB)

(73) Assignee: Research In Motion Limited, Waterloo, Ontario (CA)

( * ) Notice: Subject to any disclaimer, the term of this patent is extended or adjusted under 35 U.S.C. 154(b) by 683 days.

(21) Appl. No.: 11/286,861

(22) Filed: Nov. 23, 2005

(65) Prior Publication Data

US 2007/0117577 A1    May 24, 2007

(51) Int. Cl.
   *H04W 4/00*    (2009.01)
(52) U.S. Cl. .............. 455/466; 455/403; 455/404.1; 455/422.1; 455/414.1; 455/432.1
(58) Field of Classification Search ............ 455/466, 455/403, 550.1, 432.1, 435.1, 422.1
   See application file for complete search history.

(56) References Cited

U.S. PATENT DOCUMENTS

| | | | |
|---|---|---|---|
| 5,983,093 A * | 11/1999 | Haimi-Cohen | 455/411 |
| 6,052,591 A | 4/2000 | Bhatia et al. | |
| 6,151,507 A | 11/2000 | Laiho et al. | |
| 6,161,020 A * | 12/2000 | Kim | 455/466 |
| 6,240,296 B1 * | 5/2001 | Yu et al. | 455/466 |
| 6,292,669 B1 * | 9/2001 | Meuronen et al. | 455/466 |
| 6,424,828 B1 * | 7/2002 | Collins et al. | 455/412.1 |
| 6,775,534 B2 * | 8/2004 | Lindgren et al. | 455/521 |
| 7,362,736 B2 * | 4/2008 | Suzuki | 370/338 |
| 2001/0003094 A1 * | 6/2001 | Foll | 455/466 |
| 2003/0040300 A1 * | 2/2003 | Bodic et al. | 455/412 |
| 2004/0140928 A1 | 7/2004 | Cleghorn | |
| 2004/0152444 A1 * | 8/2004 | Lialiamou et al. | 455/406 |
| 2004/0176123 A1 * | 9/2004 | Chin et al. | 455/521 |
| 2004/0198330 A1 | 10/2004 | Graf et al. | |
| 2004/0203949 A1 * | 10/2004 | Nielsen et al. | 455/412.1 |
| 2004/0266402 A1 * | 12/2004 | Schavitz | 455/412.2 |
| 2005/0070314 A1 * | 3/2005 | Wilson | 455/466 |
| 2005/0770314 | 3/2005 | Wilson | |
| 2005/0085257 A1 * | 4/2005 | Laird et al. | 455/550.1 |
| 2005/0151642 A1 * | 7/2005 | Tupler et al. | 340/539.18 |

FOREIGN PATENT DOCUMENTS

| EP | 1575012 A2 | 9/2005 |
|---|---|---|
| GB | 2385241 | 8/2007 |

OTHER PUBLICATIONS

European Search Report for EP Patent Application #05257228.6—Mar. 2, 2006.
European Search Report for EP Patent Application #07109230.8—Dated Jul. 17, 2007.

* cited by examiner

*Primary Examiner*—Huy Phan
(74) *Attorney, Agent, or Firm*—John J. Oskorep, Esq.

(57) ABSTRACT

Methods (200, 400) and systems (300, 500) in a wireless communication network for routing a short message to a local destination are provided. A wireless communication network (104) has a list of predefined short message destinations, receives a short message having a message destination from a wireless mobile communication device (102), compares the message destination with the list of predefined short message destinations, and if the message destination matches a predefined short message destination of the list of predefined short message destinations, routes the short message to a local destination (106) corresponding to the matching predefined short message destination of the list of predefined short message destinations.

39 Claims, 5 Drawing Sheets

ROUTING OF A SHORT MESSAGE ORIGINATED BY A MOBILE DEVICE

FIELD OF THE INVENTION

The present invention generally relates to mobile communication, and more specifically to a system and a method for routing a short message originated by a wireless mobile communication device to a relevant local destination based upon characteristics of the short message.

BACKGROUND OF THE INVENTION

In today's wireless mobile communication systems, a user of a mobile wireless communication device can often communicate by sending a Short Message through the Short Message Service ("SMS"). When the user sends a SMS message, it is usually routed to the user's home network SMS Service Center ("SMS-SC"). For example, if the user's home network were in New York, N.Y., his SMS messages would be routed to his home network SMS-SC in New York, N.Y. even when he sends an SMS message while is roaming in London, England, and is out of his home network. For most applications, routing SMS messages to the user's home network SMS-SC presents no problem, but there are certain situations, such an SMS message requesting emergency assistance, where it would be preferable for the SMS message to be sent to an SMS-SC in the currently visited network and its content sent on an entity providing local emergency assistance. Presently, to provide local emergency assistance to the user, it would be necessary for a receiving Short Message Entity ("SME") in the user's home network to provide the details of the emergency SMS message to a local SME in the currently visited network where the user requires the emergency assistance. Such mechanisms can be quite complex and costly, and may well introduce delays and ineffective assistance.

SUMMARY

When a wireless communication network receives a short message from a visiting wireless mobile communication device ("mobile device") having a specific message destination such as an emergency center including police, fire station, and hospital, through the Short Message Service ("SMS"), the wireless communication network compares the message destination with a list of predefined short message destinations, and, if there is a match, routes the short message to a local SMS Service Center ("SMS-SC") instead of routing the SMS short message to the mobile device's home network SMS-SC. The wireless communication system may also send the short message to a local destination corresponding to the original message destination. Alternatively, the mobile device may receive the list of predefined short message destinations upon registering in a non-home network, and may use the list to replace the user-entered message destination with a corresponding local destination.

DETAIL DESCRIPTION OF THE PREFERRED EMBODIMENTS

Figure 1:
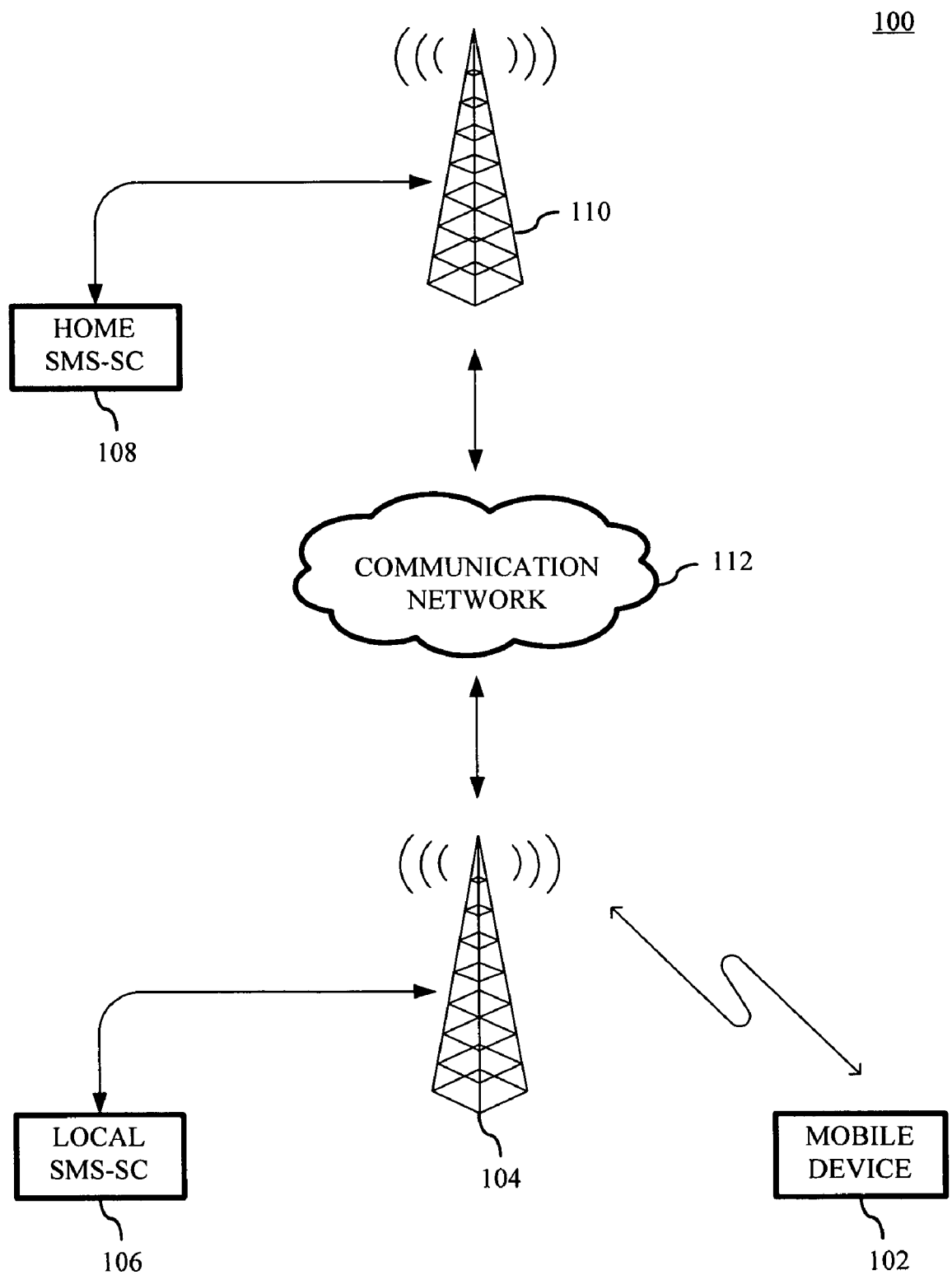
FIG. 1 is an exemplary environment in which a wireless communication system in accordance with at least one of the preferred embodiments may be practiced.

FIG. 1 is an exemplary environment 100 in which a wireless communication system in accordance with at least one of the preferred embodiments may be practiced. In this example, a mobile device 102 is registered in a non-home wireless communication network ("local network") 104, which has a local SMS-SC 106. Normally, an SMS message transmitted by the mobile device 102 will reach its home SMS-SC 108 associated with its home network 110 through the local wireless communication network 104 and a communication network 112 such as a traditional land-line communication network or wide area network 112. However, for a certain type of SMS messages, such as an SMS message requesting emergency assistance, the SMS message transmitted from the mobile device 102 is routed to the local SMS-SC 106 in the local network 104, and the content of the SMS message is sent on an entity providing local emergency assistance.

Figure 2:
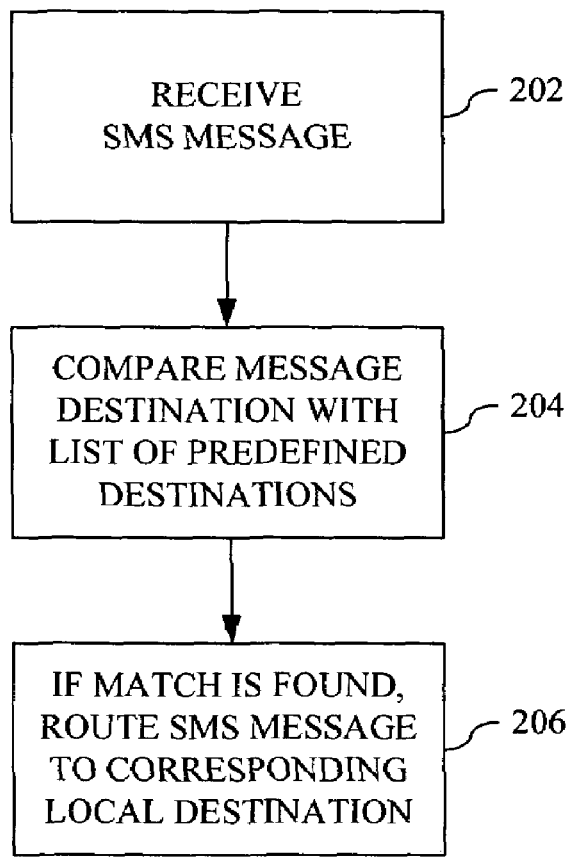
FIG. 2 is an exemplary flowchart illustrating a process of routing a short message originated by a visiting mobile device to a local short message service center in a wireless communication network in accordance with at least one of the preferred embodiments.

FIG. 2 is an exemplary flowchart 200 illustrating a process of routing a short message originated by a visiting mobile device 102 to local short message service center 106 in the local network 104 in accordance with at least one of the preferred embodiments. In block 202, the local network 104 receives an SMS message having a message destination from the mobile device 102. The message destination is the address of the intended recipient which the user of the mobile device 102 inserts, known as the Transport Protocol Destination Address ("TP-DA"). In the case of an emergency short message this TP-DA will be a short code such as 911, 112, 999, or any predefined code known to indicate that the short message concerns an emergency situation. The local network 104 has a list of predefined short message destinations, which is used to route the SMS message from the mobile device 102 to an appropriate local destination. The predefined short message destinations may be a plurality of emergency center destinations such as, but no limited to police, fire department, hospital, 911, 112, 999, or any other destinations associated with emergency centers. Each emergency center destination may have a corresponding short message destination for a locally located emergency center. Although the mobile device 102 automatically inserts the routing information, i.e. the address of the home SMS-SC, the local network 104 evaluates the TP-DA and routes the short message to an appropriate SC. In block 204, the local network 104 compares the message destination, or TP-DA, with the list of predefined short message destinations. If a match is found in block 204, the local network 104 route the SMS message from the mobile device 102 to a local destination corresponding to the matching predefined short message destination of the list of predefined short message destinations in block 206. The local destination may be a local SMS-SC 106 or a locally located emergency center. The local network 104 may route the SMS message a local destination in various ways including: replacing the original message destination with the local destination and transmitting the short message to the local destination; forwarding the short message to the local destination; and generating a new short message having the local destination, appending the original short message to the new short message, and transmitting the new short message having the appended short message to the local destination.

Figure 3:
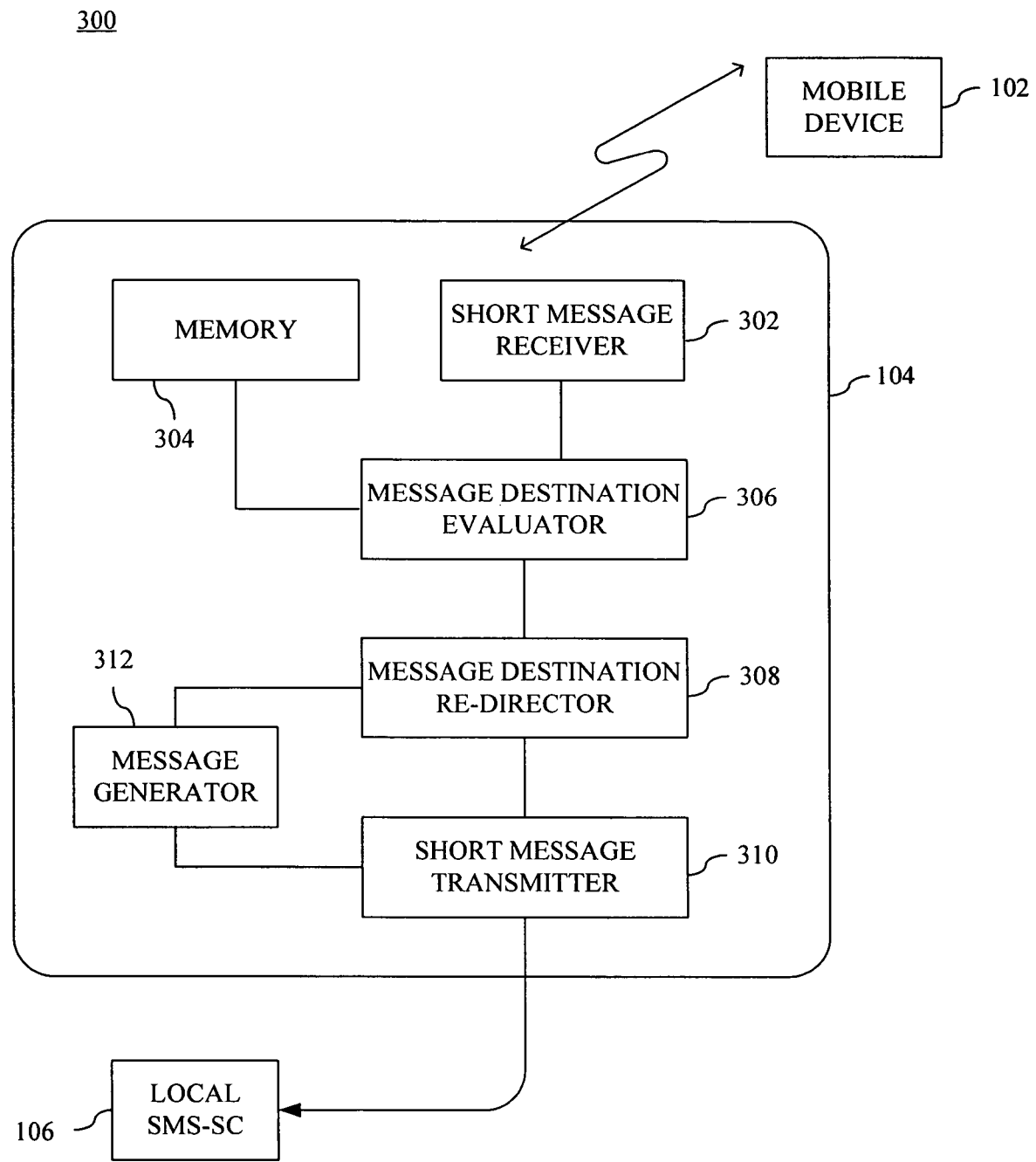
FIG. 3 is an exemplary block diagram of a wireless communication network configured to route a short message to a local destination in accordance with at least one of the preferred embodiments.

FIG. 3 is an exemplary block diagram 300 of the local network 104 configured to route a short message to a local destination in accordance with at least one of the preferred embodiments. The local network 104 has a short message receiver 302 configured to receive a short message having a message destination from a locally registered mobile device such as the mobile device 102. The local network 104 has a memory device 304, which is configured to store the previously described list of predefined short message destinations. A message destination evaluator 306 is coupled to both the short message receiver 302 and the memory 304, and is configured to match the message destination with a predefined short message destination of the list of predefined short message destinations in the memory 304. A message destination re-director 308 is couple to the message destination evaluator 306, and is configured to re-direct the short message to a local destination corresponding to the matching predefined short message destination of the list of predefined short message destinations. The message destination re-director 308 may be further configured to replace the message destination with the local destination. A short message transmitter 310 is coupled to the message destination re-director 308 and is configured to transmit the short message to the local destination such as the local SMS-SC 106. The short message transmitter 310 may be further configured to forward the short message to the local destination. The local network 104 may also have a message generator 312 coupled to the message destination re-director 308 and the short message transmitter 310, and configured to generate a new short message having the local destination and to append the short message to the new short message.

Figure 4:
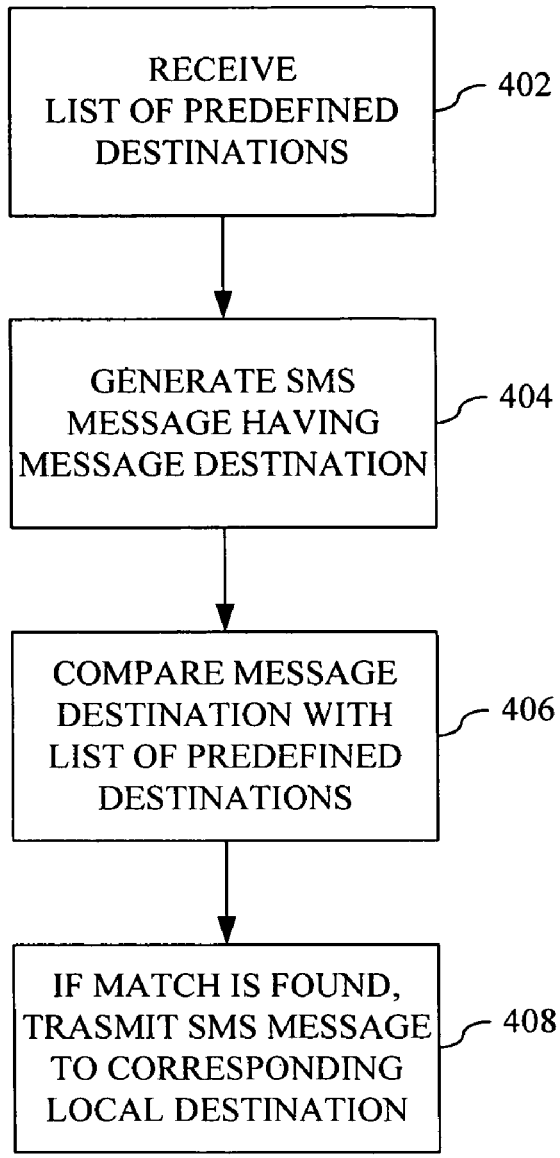
FIG. 4 is an exemplary flowchart illustrating a process of routing a short message originated by a mobile device to a local short message service center by the mobile device in accordance with at least one of the preferred embodiments.

Alternatively, the mobile device 102 may direct the SMS message to an appropriate local destination such as the local SMS-SC 106. FIG. 4 is an exemplary flowchart 400 illustrating a process of routing the SMS message originated by the mobile device 102 to the local SMS-SC 106 by the mobile device 102 in accordance with at least one of the preferred embodiments. In block 402, the mobile device 102 receives the list of predefined short message destinations, which has been described previously. The mobile device 102 may receive the list of predefined short message destinations upon registering in a non-home network of the mobile device 102 such as the local network 104. In block 404, the mobile device 102 generate an SMS message having a message destination, and compares the message destination with the list of predefined short message destinations in block 406. If the message destination matches a predefined short message destination of the list of predefined short message destinations, the mobile device 102 transmits the SMS message to a local destination corresponding to the matching predefined short message destination of the list of predefined short message destinations in block 408. The mobile device 102 may transmit the SMS message to the local destination by replacing the original message destination with the local destination corresponding to the matching predefined short message destination of the local list of predefined local destination.

Figure 5:
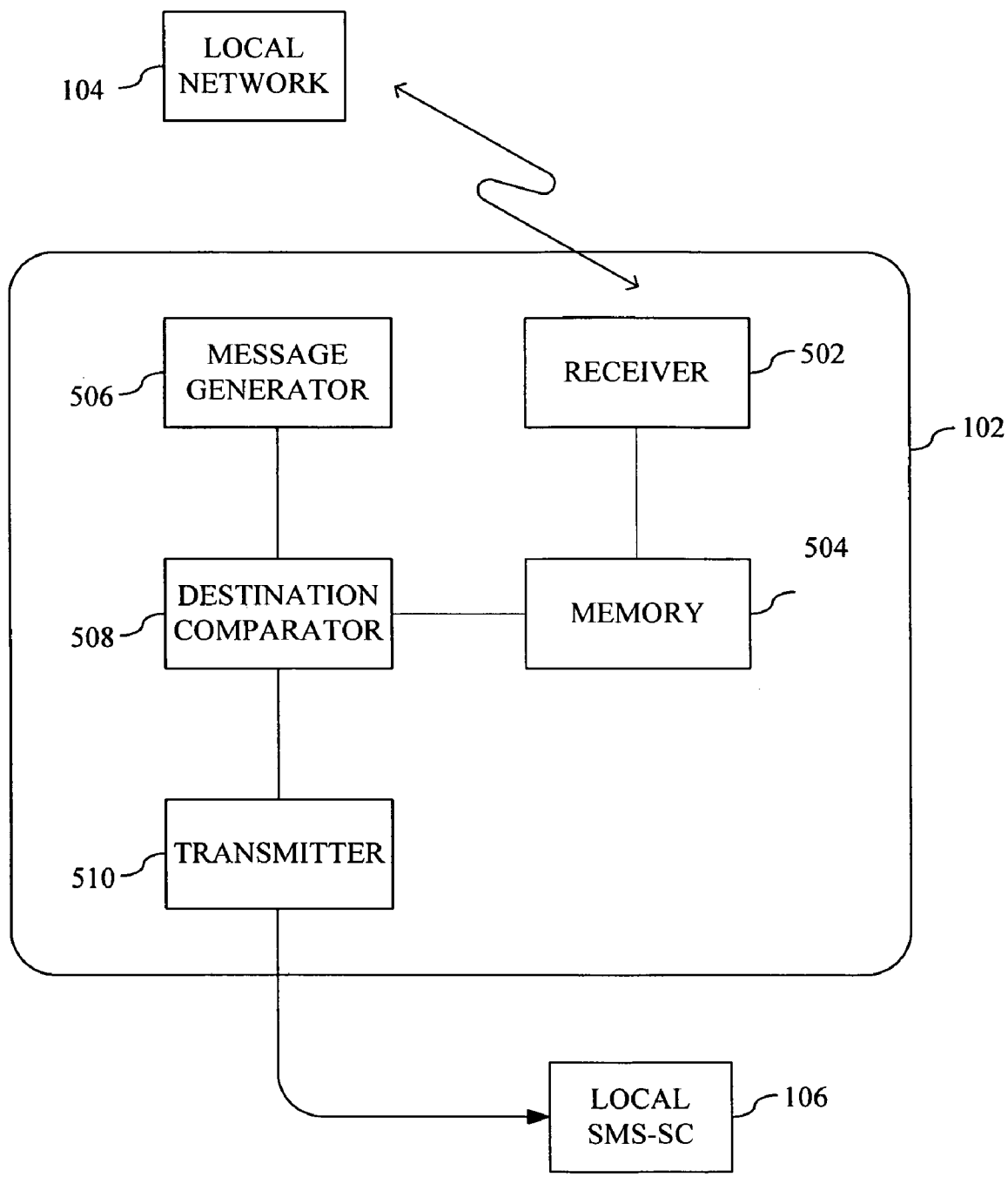
FIG. 5 is an exemplary block diagram of a wireless mobile communication device configured to route a short message to a local destination in accordance with at least one of the preferred embodiments.

FIG. 5 is an exemplary block diagram 500 of the mobile device 102 configured to route a short message to the local SMS-SC 106 in accordance with at least one of the preferred embodiments. The mobile device 102 has a receiver 502, which is configured to receive the list of predefined short message destinations previously described, from the local network 104, and has a memory device 504 coupled to the receiver 502, which is configured to store the list of predefined short message destinations. The receiver 502 may be configured to receive the list of predefined short message destinations only after the mobile device 102 registers in a non-home network such as the local network 104. The mobile device 102 also has a short message generator 506, which is configured to generate a short message having a message destination. A destination comparator 508 is coupled to the memory device 504 and the short message generator 506, and is configured to match the message destination with a predefined short message destination of the list of predefined short message destinations stored in the memory device 504. A transmitter 510 is coupled to the destination comparator 508, and is configured to transmit the short message to a local destination corresponding to the matching predefined short message destination of the list of predefined short message destinations. The destination comparator 508 may be further configured to replace the message destination with the local destination corresponding to the matching predefined short message destination of the local list of predefined local destination.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a wireless communication network for routing a short message for a mobile communication device which is registered to operate therein, the wireless communication network being a local non-home network of the mobile communication device, the wireless communication network having a list of predefined emergency center destinations which are numeric short codes known to indicate emergency assistance, the method comprising:

receiving a short message originated by the mobile communication device in the wireless communication network, the short message having a message destination;

comparing the message destination with the list of predefined emergency center destinations which are the numeric short codes known to indicate emergency assistance;

if the message destination is a numeric short code matching one of the predefined short message destinations of the list of predefined emergency center destinations, causing the short message to be routed to a locally-located emergency center corresponding to the matching predefined emergency center destination by:

generating a new short message having the locally-located emergency center destination;

appending the short message having the locally-located emergency center destination to the new short message;

transmitting the new short message having the appended short message to the locally-located emergency center; and otherwise, causing the short message to be routed to a home short message service center of a home network of the mobile communication device.

2. The method of claim 1, wherein each emergency center destination of the plurality of emergency center destinations has a corresponding short message destination for a locally located emergency center.

3. The method of claim 1, wherein one of the predefined short message center destinations of the list is 911.

4. The method of claim 1, wherein one of the predefined short message center destination of the list is 112.

5. The method of claim 1, wherein the locally-located emergency center is associated with either police, fire department, or hospital.

6. The method of claim 1, wherein one of the predefined short message center destination of the list is 112.

7. The method of claim 1, wherein the locally-located emergency center is associated with either police, fire department, or hospital.

8. A wireless communication network configured to route a short message for a mobile communication device which is registered to operate therein, the wireless communication network being a local non-home network of the mobile communication device, the wireless communication network comprising:
   a short message receiver configured to receive a short message originated by the mobile communication device in the wireless communication network, the short message having a message destination;
   memory configured to store a list of predefined emergency center destinations which are numeric short codes known to indicate emergency assistance;
   a message destination evaluator coupled to the short message receiver and the memory, the message destination evaluator configured to match the message destination with a predefined emergency center destination of the list of predefined emergency center destinations;
   a message destination re-director coupled to the message destination evaluator, the message destination re-director configured to re-direct the short message to a locally-located emergency center corresponding to the matching predefined emergency center destination if the message destination is a numeric short code matching one of the predefined short message destinations of the list, but otherwise route the short message to a home short message service center of a home network of the mobile communication device;
   a message generator coupled to the message destination re-director, the message generator configured to generate a new short message having the locally-located emergency center destination and to append the short message to the new short message; and
   a short message transmitter coupled to the message generator, the short message transmitter configured to transmit the new short message having the appended short message to the locally-located emergency center.

9. The wireless communication network of claim 8, wherein one of the predefined short message center destinations of the list is 911.

10. The wireless communication network of claim 8, wherein one of the predefined short message center destinations of the list is 112.

11. A method in a wireless mobile communication device, the method comprising:
   receiving, at the wireless mobile communication device via a wireless communication network, a list of predefined short message destinations comprising a plurality of emergency center destinations, each said emergency center destination of the plurality of emergency center destinations having a corresponding short message destination for a locally-located emergency center;
   storing, in memory of the wireless mobile communication device, the received list of predefined short message destinations;
   generating a short message having a message destination;
   comparing, by the wireless mobile communication device, the message destination of the short message with emergency center destinations in the received list; and
   if, as identified by the wireless mobile communication device, the message destination of the short message matches one of the emergency center destinations of the received list based on the comparing, then transmitting the short message to a locally-located emergency center corresponding to the matching predefined emergency center destination.

12. The method of claim 11, wherein the act of receiving the list of predefined short message destinations includes:
   receiving the list upon registering in a non-home network of the wireless mobile communication device.

13. The method of claim 11, wherein transmitting the short message to the locally-located emergency center corresponding to the matching predefined emergency center destination includes:
   replacing the message destination of the short message with the matching predefined emergency destination.

14. The method of claim 11, further comprising:
   otherwise, causing the short message to be routed to a home short message service center of a home network of the mobile communication device.

15. The method of claim 11, wherein the plurality of emergency center destinations include numeric short codes known to indicate emergency assistance.

16. The method of claim 11, wherein the short message is a short message service (SMS) message.

17. The method of claim 11, wherein the message destination is a Transport Protocol Destination Address (TP-DA) of the short message.

18. The method of claim 11, wherein one of the predefined emergency center destinations in the list is 112.

19. The method of claim 11, wherein the locally-located emergency center is associated with either police, fire department, or hospital.

20. A wireless mobile communication device comprising:
   a receiver configured to receive, via a wireless communication network, a list of predefined short message destinations comprising a plurality of emergency center destinations, each said emergency center destination of the plurality of emergency center destinations having a corresponding short message destination for a locally-located emergency center;
   memory coupled to the receiver, the memory configured to store the received list of predefined short message destinations;
   a short message generator configured to generate a short message having a message destination;
   a destination comparator coupled to the memory and the short message generator, the destination comparator configured to match the message destination of the short message with emergency center destinations of the received list; and
   a transmitter coupled to the destination comparator, the transmitter configured to transmit the short message to a locally-located emergency center corresponding to the matching predefined emergency center destination.

21. The wireless mobile communication device of claim 20, wherein the receiver is further configured to receive the list upon registration in a non-home network of the wireless mobile communication device.

22. The wireless mobile communication device of claim 20, wherein the destination comparator is further configured to replace the message destination of the short message with the matching predefined emergency center destination.

23. The wireless mobile communication device of claim 20, wherein one of the emergency center destinations in the list is 911.

24. The wireless mobile communication device of claim 20, wherein the short message is a short message service (SMS) message.

25. The wireless mobile communication device of claim 20, wherein the message destination is a Transport Protocol Destination Address (TP-DA) of the short message.

26. The wireless mobile communication device of claim 20, wherein the message destination is a numeric short code entered at the wireless mobile communication device.

27. A method in a wireless communication network for routing a short message for a mobile communication device which is registered to operate therein, the wireless communication network being a local non-home network of the mobile communication device, the wireless communication network having a list of predefined emergency center destinations which are numeric short codes known to indicate emergency assistance, the method comprising:
  receiving a short message originated by the mobile communication device in the wireless communication network, the short message having a message destination;
  comparing the message destination with the list of predefined emergency center destinations which are the numeric short codes known to indicate emergency assistance;
  if the message destination is a numeric short code matching one of the predefined short message destinations of the list of predefined emergency center destinations, causing the short message to be routed to a locally-located emergency center corresponding to the matching predefined emergency center destination by:
    replacing the message destination with the locally-located emergency center destination; and
    transmitting the new short message having the locally-located emergency center destination to the locally-located emergency center; and
  otherwise, causing the short message to be routed to a home short message service center of a home network of the mobile communication device.

28. The method of claim 27, wherein each emergency center destination of the plurality of emergency center destinations has a corresponding short message destination for a locally located emergency center.

29. The method of claim 27, wherein one of the predefined short message center destinations of the list is 911.

30. A wireless communication network configured to route a short message for a mobile communication device which is registered to operate therein, the wireless communication network being a local non-home network of the mobile communication device, the wireless communication network comprising:
  a short message receiver configured to receive a short message originated by the mobile communication device in the wireless communication network, the short message having a message destination;
  memory configured to store a list of predefined emergency center destinations which are numeric short codes known to indicate emergency assistance;
  a message destination evaluator coupled to the short message receiver and the memory, the message destination evaluator configured to match the message destination with a predefined emergency center destination of the list of predefined emergency center destinations;
  a message destination re-director coupled to the message destination evaluator, the message destination re-director being configured to:
    if the message destination is a numeric short code matching one of the predefined short message destinations of the list, re-direct the short message to a locally-located emergency center corresponding to the matching predefined emergency center destination by replacing the message destination with the locally-located emergency center destination;
    otherwise, if the message destination is not a numeric short code matching one of the predefined short message destinations, route the short message to a home short message service center of a home network of the mobile communication device; and
  a short message transmitter coupled to the message destination re-director, the short message transmitter configured to transmit the short message to the locally-located emergency center.

31. The wireless communication network of claim 30, wherein one of the predefined short message center destinations of the list is 911.

32. The wireless communication network of claim 30, wherein one of the predefined short message center destinations of the list is 112.

33. A method in a wireless mobile communication device for directing a short message to an appropriate local destination, the method comprising:
  receiving, at the wireless mobile communication device, a list of predefined short message destinations;
  generating a short message having a message destination;
  comparing, by the wireless mobile communication device, the message destination with the list of predefined short message destinations; and
  if the message destination matches a predefined short message destination of the list of predefined short message destinations based on the comparing: replacing the message destination with a local destination corresponding to the matching predefined short message destination, and transmitting the short message to the local destination.

34. The method of claim 33, wherein receiving a list of predefined short message destinations includes:
  receiving a list of predefined short message destinations upon registering in a non-home network of the wireless mobile communication device.

35. The method of claim 33, wherein the local destination corresponding to the matching predefined short message destination of the list of predefined short message destinations includes a local short message service center.

36. The method of claim 33, wherein the list of predefined short message destinations includes a plurality of emergency center destinations, each emergency center destination of the plurality of emergency center destinations having a corresponding short message destination for a locally located emergency center.

37. A wireless mobile communication device configured to direct a short message to an appropriate local destination, the wireless mobile communication device comprising:
  a receiver configured to receive a list of predefined short message destinations;

memory coupled to the receiver, the memory configured to store the received list of predefined short message destinations;

a short message generator configured to generate a short message having a message destination;

a destination comparator coupled to the memory and the short message generator, the destination comparator configured to match the message destination with a predefined short message destination of the list of predefined short message destinations, and to replace the message destination with a local destination corresponding to the matching predefined short message destination; and, a transmitter coupled to the destination comparator, the transmitter configured to transmit the short message to the local destination.

38. The wireless mobile communication device of claim 37, wherein the receiver is further configured to receive the list of predefined short message destinations after the wireless mobile communication device registers in a non-home network of the wireless mobile communication device.

39. The wireless mobile communication device of claim 37, wherein the list of predefined short message destinations includes a plurality of emergency center destinations, each emergency center destination of the plurality of emergency center destinations having a corresponding short message destination for a locally located emergency center.

* * * * *